UNITED STATES PATENT OFFICE.

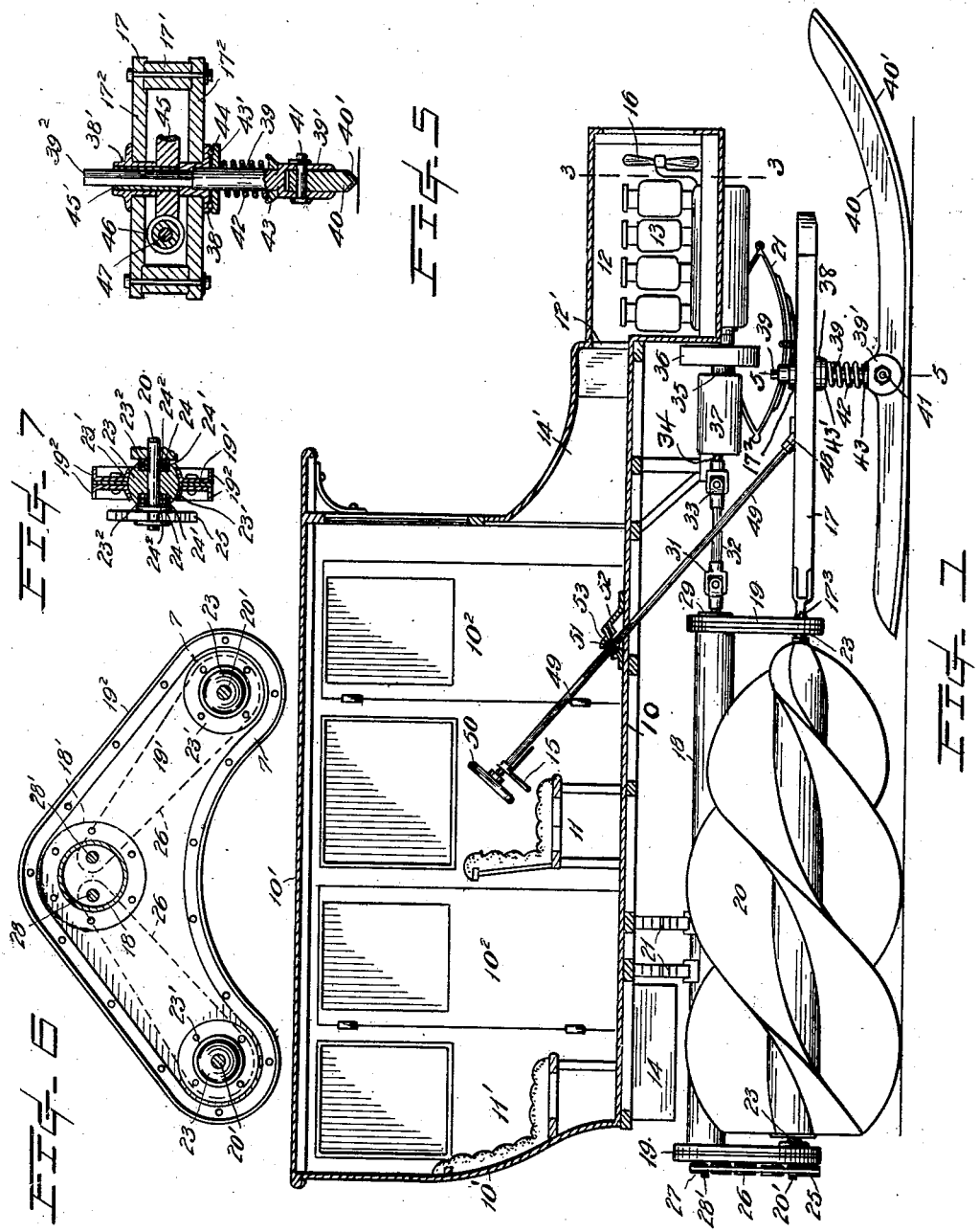

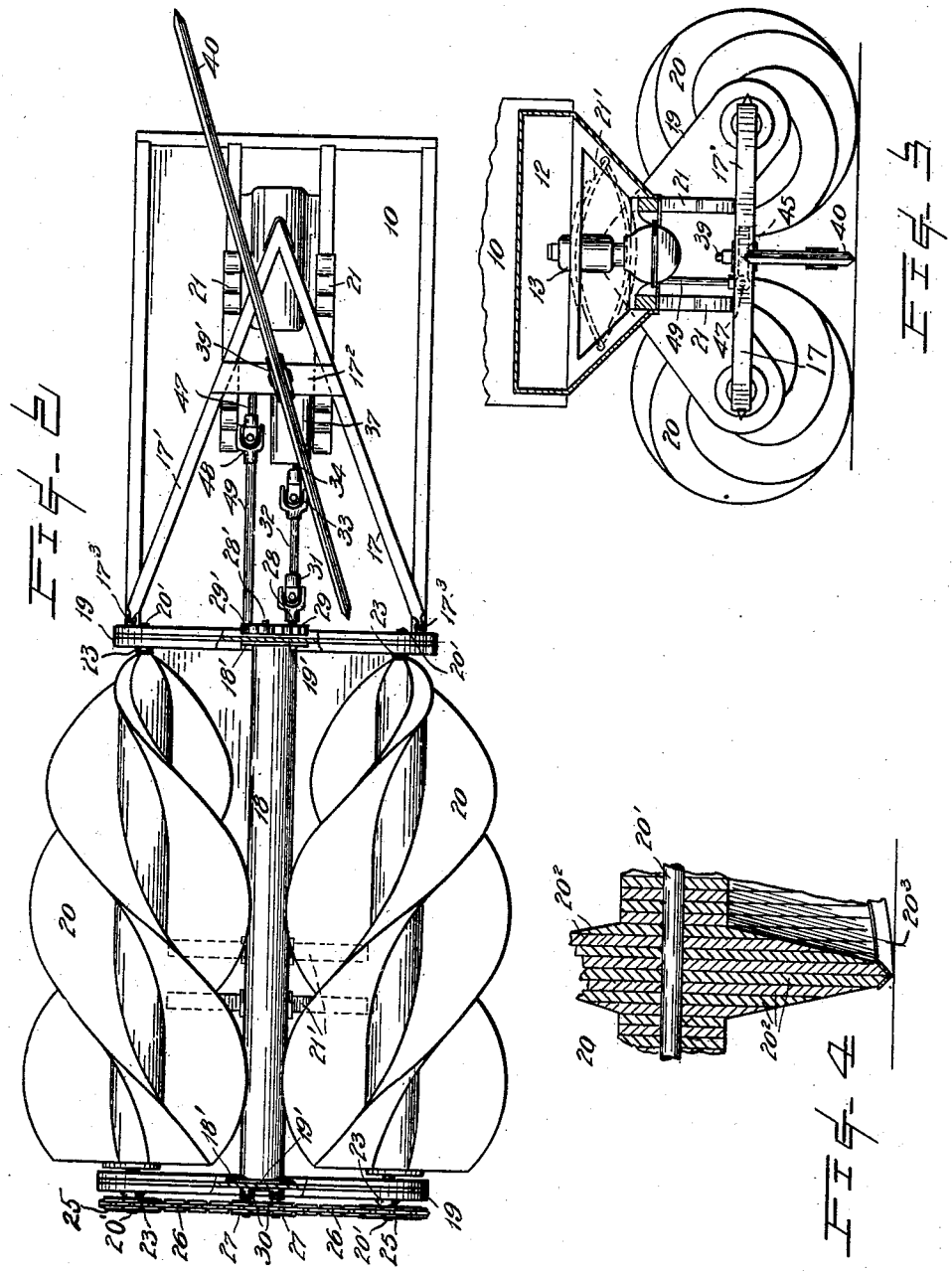

CHARLES E. S. BURCH, OF SEATTLE, WASHINGTON.

AUTOMOBILE-SLEIGH.

No. 903,540.        Specification of Letters Patent.        Patented Nov. 10, 1908.

Application filed June 20, 1907. Serial No. 379,999.

*To all whom it may concern:*

Be it known that I, CHARLES E. S. BURCH, a citizen of the United States, residing at Seattle, in the county of King and State of Washington, have invented certain new and useful Improvements in Automobile-Sleighs, of which the following is a specification, reference being had therein to the accompanying drawings.

My invention relates to vehicles adapted for propelling themselves over the surface of ice or snow, and especially to improvements in the vehicle of this class which is illustrated and described in United States Patent No. 669,210, granted to me March 5, 1901.

The object of this invention is the provision of a motor driven sleigh or vehicle which will embody the following characteristics, an inexpensive construction, the comfort and protection to the occupants from cold and inclement weather, economy in the consumption of power when driven at various speeds, steadiness in movement, adaptation to conditions of service for which intended and, generally, a high degree of efficiency.

With these ends in view the invention consists in the combination with driving screws of a steering runner serving to support part of the weight of the vehicle body and thereby relieving the driving screws in order that the power imparted to rotate them will be effectually employed in propelling the vehicle.

The invention further consists in the adaptation and assemblage of parts whereby a flexibility of structure is attained with a consequent absence of vibrations in operation.

The invention further consists in the peculiar construction of such parts and the various combinations thereof, as will be hereinafter described and claimed.

Figure 1 is a side elevation, partly in section, of an automobile sleigh embodying my invention. Fig. 2 is an underside view; and Fig. 3, a partly sectional end elevation of the same, the sectional portion thereof being taken through 3—3 of Fig. 1. Fig. 4 is a fragmentary detail view enlarged of one of the driving screws. Fig. 5, a sectional view enlarged taken through the line 5—5 of Fig. 1. Fig. 6, is an enlarged detail view of a part of the truck-frame, with the chain driving gear shown somewhat diagrammatically, and Fig. 7, a sectional detail view taken through the line 7—7 of Fig. 6.

The reference numeral 10 designates the body or platform portion of the vehicle which is desirably closed in by a suitable housing 10', provided with side doors $10^2$ and within the compartment thus provided are, desirably, front and rear seats 11, 11' for the occupants.

Within a chamber 12 at the front of the body is positioned a motor 13, preferably of the internal combustion type, to furnish the power for propelling the vehicle, and for which are provided tanks, as 14 and 14', for the liquid fuel which is supplied as required, to the motor by conduits which are controlled with suitable valves by the operator from the operator's seat 11, as by a suitably connected throttle-handle 15. The various connections between the fuel tanks and the motor are not shown as they form no part of the present invention.

The motor cylinders are desirably arranged to be cooled by radiation through exposure to a current of air impelled by a rotary fan 16 thereagainst, and thence is caused to flow through a communicating passage or heating conduit 12' to within said compartment 10' for the purpose of employing the heat derived from the engine for warming the latter.

At the forward end of and below the vehicle-body is a rigidly constructed frame which is triangular in horizontal section and comprised of side members 17—17' which are joined at their forward ends and connected intermediately of their lengths by tie-bars $17^2$, while their rear ends are respectively hinged, as at $17^3$, to the truck-frame. Such truck-frame consists of a longitudinal tubular member 18 rigidly connected at its respective ends, as by flanges 18' to the plate-webs 19' of transverse members 19, arranged to support the bearings for the axles 20' of the driving screw devices 20, and are desirably provided along their edges with reinforcing strips or bars $19^2$. Positioned between the frame 17—17' and the body 10 are laminated plate carriage springs 21 and similar springs 21' are provided between the truck-frame and the body at the rear. Of these springs, the former are advantageously disposed longitudinally of the vehicle, and the others transversely thereof, in order that the load borne thereupon will be more evenly distributed and to better accommodate themselves to the stresses to which they are severally subjected, that is to say, in frame 17 to oppose lateral tilting while in the truck-frame the tilting would be principally in a longitudinal direction. The above mentioned screws 20 are each comprised of a plurality of spiral webs, preferably four, and those upon one screw being arranged to form right hand threads and those upon the other left hand threads. The screws are desirably composed, see Fig. 4, of a number of juxtaposed wooden plates, or boards, $20^2$ arranged upon the respective axles 20', so that their grain or fibers will respectively extend in radial directions, as nearly as may be, and serving to furnish a rigid construction for supporting their load, as well as being capable of withstanding the shearing stresses encountered in propelling the vehicle. The peripheral edges of said webs are protected against wear by having clamped thereto metal angle-bars $20^3$ in such manner that the apices thereof will be revolubly presented to the surface upon which the vehicle travels. The screw-axles 20', see Figs. 6 and 7, are journaled in spherical bearings 23, or globes, as they will be hereinafter designated, which are themselves journaled in suitable receptacles formed in the aforesaid frame members 19, as by flanged rings 23' bolted to opposite faces of the frame-webs 19' and having their flanges formed interiorly to register with and embrace the respective said globes. Furthermore, anti-friction bearings are had between the globes and the several axles by suitable ball-bearings as, for example, groups of relatively small balls 24 seated in grooves of the exteriorly and interiorly arranged retaining rings 24' and $24^2$, respectively, which are positioned within recesses $23^2$ of the globes, and having the inner of each pair of such rings fitted upon the respective axles. The said manner of journaling the screw devices not only provided effective anti-friction bearings, but likewise affords means to compensate for the end thrusts transmitted from such devices to the frame.

To the rear extremities of the axles 20' are fixedly secured sprocket wheels 25 operatively connected by driving chains 26 with sprocket wheels 27 mounted upon a pair of shafts 28, 28' extending, preferably, through and beyond the forward end of the tubular member 18 of the truck-frame, and are operatively connected thereat by toothed gears 29 and 29' so as to be rotated in unison but in opposite directions. Said shafts 28—28' are journaled in suitable boxes, indicated by 30, provided within the containing tubular member 18, and, in practice, would desirably be provided with suitable anti-friction bearings, such as above described for said axle ends. One of these shafts, 28, is prolonged for being secured to a part of a universal joint 31 which couples the same to a shaft 32 which, in turn, is likewise coupled through a universal joint 33 with a shaft 34. The latter is driven from the motor 13 by intermediately disposed connections including a two-part shaft 35 adapted to be coupled through the medium of a clutch, indicated by 36, and imparts the motion derived from the motor at selective speeds and in reverse directions by the employment of suitable variable transmission gears which are inclosed in a case 37.

To the tie-bars $17^2$ of the frame 17, as best shown in Fig. 5, are socket attachments 38 and 38' spaced at some distance apart and respectively forming the bearings for the cylindrical portion 39 and a bushing 45' upon the square end $39^2$ of an upright post which is provided with a forked lower end 39' adapted to loosely straddle a runner 40 and be tiltably connected to the latter by a pin 41. The runner is connected to the post, as aforesaid, at or about its mid-length and is curved upward toward its advance end and terminates in approximately the same horizontal plane as the axis of said driving screws. The runner is desirably constructed of wood which is shod by a triangular shaped protective shoe 40'. Said post has a spiral spring 42 thereabout which acts to resiliently sustain the frame 17 and superimposed weights, and to such ends, and with little resistance to the horizontal oscillations of the runner, I interpose a washer 43 between the foot of the spring and the forked end of the post, and another washer 43' between the opposite end of the spring and the lower of the aforesaid socket attachments, 38, with intervening ball-bearings 44 bearing between such attachment and the washer 43'.

Fixedly mounted upon said bushing 45' and between the two socket attachments 38—38' and guarded, as will be noted, by the surrounding elements of the frame 17, is a worm wheel 45 which is actuated to turn the runner by a worm pinion 46. The latter is secured to a shaft 47 which is connected by a universal joint 48 with an inclined steering rod 49 extending into the inclosed part 10' of the vehicle-body and provided with a steering wheel 50 arranged to be within convenient reach of the operator's seat.

In order to allow of said steering rod to accommodate itself to various undulating motions encountered by the vehicle, and at the same time to avoid an opening about the rod for the passage of air where it passes through the vehicle floor, I provide a globular bushing 51 therefor within a concave seat in a floor plate 52, and rotatably held in place by an annular gland-piece 53, which is detachably secured to the plate.

The operation of the invention will, it is thought, be understood from the foregoing when taken in connection with the following noted advantages: Among such advantages is the combination of a runner with the screw devices whereby the load is so distributed that resistance to the rotating of the propelling screws will not be excessive, and enabling the vehicle to be propelled with a relatively small consumption of power. The runner not only serves in such capacity but likewise to steer the vehicle.

The peculiar construction of both the screws and the runner offers a maximum of strength and rigidity with a low cost of construction and lightness in weight, and particularly noteworthy is the construction of the screw devices which being composed of spiral webs radiating from a central boss through which extends an iron axle, and forming a structure which is exceedingly stiff. Furthermore, the employment of angular shaped shoes for the runner and the peripheries of the screw blades, serve to protect the wooden portions thereof from becoming abraded by the hard ice surface, and at the same time act to cut into the hard crust encountered upon the ice surface for a better engagement therewith for the proper rendering of their respective functions, and at the same time enabling them to cut through frozen films of sand or other foreign substances often found upon the surface of ice, situations where this invention is especially valuable. Furthermore, the assemblage of the parts with their resilient connections therebetween, is such as to allow of flexibility of movement without derangement of operative parts, and to accommodate the vehicle for use in places where the surface is rough or uneven. The location of the power transmitting shafting is such that it is protected by the inclosing casings, together with their relatively high elevation, render the same little liable to become injured through encountering obstacles upon the track surface. And still further, in the provision of a closed in vehicle to protect the occupants against exposure, and the provision of means for utilizing the waste heat radiated from the motor to effect the warming of the interior of the closure.

Having described my invention, what I claim, is—

1. In an auto sleigh, a body, a truck frame comprising a longitudinal member and transverse end members, means for yieldably connecting said truck frame to said body, screw devices mounted for rotation in said end members, a motor carried by said body, and flexible connecting means between said motor and screw devices, whereby said screw devices are caused to rotate in opposite directions.

2. In an auto sleigh, a body, a truck frame comprising a longitudinal member and transverse end members, means for yieldably connecting said truck frame to said body near one end, screw devices mounted for rotation in said end members, a runner frame flexibly connected at one end to said truck frame and yieldably connected at the other end to said body, a post mounted for rotation in said runner frame, a runner carried by said post, a motor carried by said body, flexible connecting means between said motor and screw-devices, and means under the control of the operator for operating said post and the runner carried thereby.

3. In an automobile sleigh, a body, a truck frame connected beneath said body, screw devices mounted for rotation in said truck frame, a runner frame comprising side members connected together at their forward ends and diverging rearwardly and flexibly connected to the truck frame, a post mounted for rotation in said runner frame near its forward united ends, a runner carried by said post, a motor carried by said body, flexible connecting means between said motor and screw devices whereby said screw devices are caused to rotate in opposite directions, and means under the control of the operator for actuating said post and the runner carried thereby.

4. In an automobile sleigh, a body, a truck frame comprising a longitudinal member and transverse end members, means for yieldably connecting said truck frame to said body, screw devices mounted for rotation in said end members, a motor carried by said body, flexible connecting means between said motor and screw devices, a runner frame comprising side members connected together at their forward ends and diverging rearwardly and flexibly connected to the truck frame, a post mounted for rotation in said runner frame near its forward end, a runner carried by said post, and means under the control of the operator for actuating said post and the runner carried thereby.

5. In an automobile sleigh, a body, a truck frame comprising a longitudinal member and transverse members connected to the ends of a tubular member, yieldable means connecting the tubular member to the body, screw devices mounted for rotation in said transverse end members, spaced shafts extending through said tubular member and carrying inter-engaging gears, a motor carried by said body, flexible connecting means between said motor and one of said spaced shafts, and means for transmitting the motion of said spaced shafts respectively to said screw devices.

6. In an automobile sleigh, the combination with the propelling screw devices, of a truck-frame therefor comprising a longitudinal tubular member and transverse end members, and spherical shaped bearings carried in the latter for journaling the axles of said screw devices.

7. In an automobile sleigh, a body, a truck frame comprising a longitudinal member and transverse members connected to the ends of a tubular member and with globular seats in said end members, globular bearings engaging said seats, shafts mounted for rotation in said bearings, screw devices carried by said shafts, yieldable means connecting the tubular member to the body, spaced shafts extending through said tubular member and carrying inter-engaging gears, a motor carried by said body, flexible connecting means between said motor and one of said spaced shafts, and means for transmitting the motion of said spaced shafts respectively to the shafts of said screw devices.

8. In an automobile sleigh, a body, a truck frame comprising a longitudinal member and transverse members connected to the ends of a tubular member, yieldable means connecting the tubular member to the body, screw devices mounted for rotation in said transverse end members, spaced shafts extending through said tubular member and carrying inter-engaging gears, a motor carried by said body, flexible connecting means between said motor and one of said spaced shafts, means for transmitting the motion of said spaced shafts respectively to said screw devices, a runner frame comprising side members connected together at their forward ends and diverging rearwardly and flexibly connected to the truck frame, a post mounted for rotation in said runner frame near its forward end, a runner carried by said post, a motor carried by said body, and flexible connecting means between said motor and screw devices.

9. In an automobile sleigh, the combination with the body, propelling screw devices, a frame carrying said devices, a runner, and a motor, of driving connections for the screw devices and comprising a shaft for each such screw device, said shafts being geared so as to rotate in opposite directions, chain connections between the respective shafts and the screw devices, and driving connections between one of said shafts and the motor.

10. In an automobile sleigh, the combination with the body and a power motor carried therein, of two propelling screw devices rotatably mounted in a truck-frame below the body, said truck-frame, flexible driving connections between said motor and each of said screw devices, a supporting and steering runner provided with an upright post, a frame carrying the post and hinged to said truck-frame, springs carried by said frames for supporting said body, and means extending into the body for controlling the movements of said runner.

11. In an automobile sleigh, the combination with the body and a power motor carried therein, of two propelling screw devices rotatably mounted in a truck-frame below the rear end of the body, said truck-frame, driving connections between said motor and each of said screw devices, a supporting and steering runner below the front end of said body and provided with an upright post, a frame carrying the post and hinged to said truck-frame, springs carried by said frames for supporting said body, and means extending into the body for controlling the movements of said runner.

12. In an automobile sleigh, the combination with the body, of propelling screw devices, a truck carrying said screw devices, a steering runner, a frame carrying said runner, said frame being flexibly connected to the truck, springs carried by both the truck and the frame for supporting the body, and means to rotate said screw devices.

In testimony whereof I affix my signature in presence of two witnesses.

CHARLES E. S. BURCH.

Witnesses:
 PIERRE BARNES,
 J. T. FLYNN.